United States Patent
Popesco

(10) Patent No.: US 7,967,120 B2
(45) Date of Patent: Jun. 28, 2011

(54) MARITIME POWER SUPPLY SYSTEM

(75) Inventor: Ottonel Popesco, Lugano (CH)

(73) Assignee: Ipalco B.V. (NL)

( * ) Notice: Subject to any disclaimer, the term of this patent is extended or adjusted under 35 U.S.C. 154(b) by 613 days.

(21) Appl. No.: 11/720,548

(22) PCT Filed: Jun. 13, 2005

(86) PCT No.: PCT/EP2005/052716
§ 371 (c)(1), (2), (4) Date: Jul. 2, 2007

(87) PCT Pub. No.: WO2006/058797
PCT Pub. Date: Jun. 8, 2006

(65) Prior Publication Data
US 2007/0251784 A1    Nov. 1, 2007

(30) Foreign Application Priority Data
Dec. 1, 2004 (EP) .................... 04106227

(51) Int. Cl.
*H02G 11/00* (2006.01)
(52) U.S. Cl. ............. 191/12.2 R; 191/12.2 A
(58) Field of Classification Search ......... 191/12.2 R, 191/12.4, 12.2 A, 12 R; 290/1 A
See application file for complete search history.

(56) References Cited

U.S. PATENT DOCUMENTS

| | | | | |
|---|---|---|---|---|
| 3,602,730 | A * | 8/1971 | Cushing | 307/150 |
| 5,385,314 | A * | 1/1995 | Hughes | 242/397.3 |
| 6,149,096 | A * | 11/2000 | Hartley | 242/390.9 |
| 6,384,488 | B1 * | 5/2002 | Bucharelli et al. | 307/9.1 |
| 6,678,173 | B2 * | 1/2004 | Nakagawa | 363/44 |
| 2004/0195066 | A1 | 10/2004 | Widegren | |

FOREIGN PATENT DOCUMENTS

FR    2 647 604    11/1990

OTHER PUBLICATIONS

International Search Report; PCT/EP2005/052716; Sep. 30, 2005.

* cited by examiner

Primary Examiner — Mark T Le
(74) Attorney, Agent, or Firm — Cantor Colburn LLP

(57) ABSTRACT

A maritime power supply system for supplying power to a docked ship, including a cable management system having at least one power cable assembly having, at a first end, a first connection arrangement for connecting the power cable assembly to the ship and, at an opposite second end, second a connection arrangement for connecting the power cable assembly to a dockside power supply; and a reel for winding the at least one power cable assembly thereon and for unwinding the at least one power cable assembly therefrom. According to an important aspect of the invention, the cable management system is arranged in a stackable power supply container placed on the ship.

2 Claims, 3 Drawing Sheets

MARITIME POWER SUPPLY SYSTEM

TECHNICAL FIELD OF THE INVENTION

The present invention relates to a maritime power supply (MPS) system for supplying electrical power to a docked ship, in particular a container, RoRo, cruise or any other M/V ship.

BRIEF DISCUSSION OF RELATED ART

The environment in ports all over the world is becoming more and more of an issue. In the last 15 years, increasing attention has been paid on how to reduce pollution coming from the diesel engines of ships which traffic, in ever increasing numbers, the ports and terminals. Container, RoRo (roll-on/roll-off), cruise or other M/V (motorized vessel) ships often remain docked in a port for several days and keep their engines running while docked to ensure the functioning of refrigerated containers and life aboard the ship through air-conditioning, controls, etc. It is clear that this constitutes an important pollution issue, which has to be avoided. It has therefore been proposed to supply power to such ships via cables running from the dock to the ship, thereby allowing the engines to be turned off. The main problem with supplying such docked ships with power is the need for a high voltage and high amperage power supply, which has often made it necessary to use up to 10 cables in parallel. Due to this large number of cables it was not possible to connect and disconnect rapidly and safely, not to mention that they also had to cope with uneven loads between the cables. Also, the amount of cables was rather untidy and also dangerous. Furthermore, it is often not possible to align the ship-based power inlet with the dock-based power supply, which means that the cables run alongside the ship either on the dock or on the deck of the ship, causing further obstruction and danger.

The wharf or dock is generally supplied with 6600 V and a significant part of the current shipping fleet is supplied with between 230 V and 660 V, hence the necessity for using step-down transformers and/or converter sets.

A maritime power supply (MPS) system has been proposed wherein a cable management system having a cable reel with a power cable assembly mounted thereon is provided. Such a cable management system can, for example, be mounted on the side of the dock, wherein one end of the power cable assembly on the cable management system is connected to a dockside power supply. The opposite end of the power cable assembly can be unwound from the cable management system and lifted onto the ship for connection to a ship-based power inlet. In order to avoid cables running alongside the ship, the cable management system can be moveably mounted on the side of the dock. It can, for instance, be mounted on a wheeled or fixed platform that can be moved to the desired location. Alternatively, a number of cable management systems can be fixedly mounted on the side of the dock, such that one cable management system is generally not too far away from the ship's power inlet. However, a problem with the dock-based cable management system is that, generally, there is not sufficient clearance on the side of the dock due to large cranes being necessary for loading and unloading containers onto and from the ship. Alternatively, such a cable management system can be fixedly mounted on the ship, wherein one end of the power cable assembly on the cable management system is connected to a ship-based power inlet. The opposite end of the power cable assembly can be unwound from the cable management system and lowered onto the dock for connection to a dockside power supply.

Since the voltage, frequency and amperage of the dockside power supply do not necessarily correspond to the ship's needs, a step-down transformer and/or converter has to be installed between the dockside power supply and the ship-based power inlet. Such a transformer or converter causes further obstruction whether installed on the dock or on the ship. Furthermore, in case a number of cable management systems are arranged along the side of the dock, each of these cable management systems may have to be provided with a transformer or converter. It is clear that this is rather expensive and causes even more obstruction.

BRIEF SUMMARY OF THE INVENTION

The invention provides an improved maritime power supply (MPS) system for supplying power to a docked ship, in particular a container, RoRo, cruise, or any other M/V ship. The invention also provides an improved method for supplying power to such a docked ship.

According to the invention, a maritime power supply (MPS) system for supplying power to a docked ship, in particular a container, RoRo, cruise or any other M/V ship, comprises a cable management system with at least one power cable assembly having, at a first end, first connection means, preferably 6600 V electrical connectors, for connecting the MPS to the docked ship and, at an opposite second end, second connection means for connecting the power cable assembly to a dockside power supply; and a reel for winding the at least one power cable assembly thereon and for unwinding the at least one power cable assembly therefrom. According to an important aspect of the invention, the cable management system is arranged in a stackable power supply container placed on the ship. This allows the MPS to be easily placed in the desired location on the ship wherever it is needed. There is no need to provide a plurality of cable management systems on the ship. One single containerised cable management system onboard the ship will be enough; such a containerised cable management system can be placed on the port, starboard or stern of the ship. Also, the containerised cable management system can be placed in the desired place along the side of the ship, i.e. wherever is nearest to the dockside power supply. The MPS container can be moved to the desired location by the dockside crane or any other crane upon arrival at the dock, allowing the ship's engines to be turned off shortly thereafter. In case the ship is provided with an onboard crane, the power supply container can—weather permitting—also be placed in the right location before arriving at the dock, allowing the ship's engines to be turned off even earlier.

Hence, the MPS system according to the present invention allows supplying power to a docked ship, such as a container, RoRo, cruise or any other M/V ship, without the need for long cables running along the dock. Furthermore, there is no need to provide a plurality of cable management systems either on the dock or on the ship. The cable management system of the present maritime power supply system can easily and quickly be brought in the right location, i.e. in proximity to the dockside power supply. Clearance on the dock and storage space on the ship is not unduly restricted by this cable management system.

The power supply container advantageously has dimensions identical to those of goods containers placed on the ship (ISO containers). The number of containers that can be stored onboard the ship does hence not have to be unduly reduced. Also, standard dockside or onboard cranes can be used to move the power supply container from one location to another.

Preferably, the cable management system further comprises a motor coupled to a cable drum for rotating the reel. Such a motor allows winding and unwinding the power cable assembly onto or from the cable management system in a controlled manner.

Preferably, a cable guide is provided for guiding the at least one power cable assembly from and to the reel. Such a cable guide allows to safely guide the power cable assembly over the edge of the ship down to the dock, thereby preventing the power cable assembly from being dragged over the edge of the ship, which could damage the power cable assembly.

The cable guide is preferably pivotable between an active position, in which the cable guide is able to guide the power cable assembly over the edge of the ship, and a rest position, in which the cable guide is retracted. When not in use, the cable guide can hence be retracted and a more compact configuration can be obtained.

The pivotable cable guide can be operated by a hydraulic pump. Such a hydraulic pump can e.g. be hand operated or motorised.

The pivotable cable guide preferably comprises at least two support elements arranged parallel to each other; and a plurality of rolls arranged between the support elements for supporting and guiding the power cable assembly.

The MPS system can further comprise a pendant or radio control unit for controlling the motor of the reel and/or the hydraulic pump of the cable guide. Operation of the cable management system can hence be controlled from a safe distance away from any moving parts. It is however not excluded to operate the cable management system from a closer distance; even operation from within the power supply container can be possible.

According to a preferred embodiment, the MPS system according to the present invention further comprises a step-down transformer and/or converter, the transformer and/or converter being connected between the first end of the power cable assembly and the ship. The power output from the dockside power supply can thereby easily be adapted to the ship's power needs.

Furthermore, a synchronisation unit can be connected between the power cable assembly and the step-down transformer and/or converter for synchronisation of the sine wave of the electrical power from the shore to the ship.

The step-down transformer and/or converter and/or the synchronisation unit can be arranged in the power supply container comprising the cable management system. Alternatively, they can be arranged in a dedicated auxiliary power supply container.

The present invention also concerns a method for supplying power to a docked ship, in particular a container, RoRo, cruise or any other M/V ship, comprising the steps of:
placing a stackable power supply container in a desired location on the ship, the power supply container comprising a cable management system with at least one power cable assembly mounted on a reel, the power cable assembly comprising a first end and an opposite second end;
connecting the first end of the power cable assembly to the ship through electrical connectors;
unwinding the power cable assembly from the reel ; and
connecting the second end of the power cable assembly to a dockside power supply through electrical connectors.

By placing the stackable power supply container in a desired location on the ship before or shortly after arrival of the ship in the port, the cable management system can be placed where it is needed, i.e. in proximity to the dockside power supply. It is then not necessary to provide a plurality of cable management systems on the ship, thereby saving costs.

Preferably, the step of unwinding the power cable assembly from the reel comprises the step of operating a motor coupled to a cable drum in order to facilitate the winding and unwinding of the power cable assembly.

The method can comprise, before the step of unwinding the power cable assembly from the reel, the step of bringing a cable guide from a rest position to an active position so as to guide the power cable assembly over the edge of the ship, thereby preventing the power cable assembly from being dragged over the edge of the ship, which could damage the power cable assembly.

The step of bringing the cable guide into an active position can comprise the step of operating a hydraulic pump. The hydraulic pump can be manually or electrically operated.

The motor and/or the hydraulic pump are controlled by means of a pendant or radio remote control unit.

The method can comprise the further step of operating a step-down transformer and/or converter connected between the power cable assembly and the ship, the transformer and/or converter being arranged in the stackable power supply container.

BRIEF DESCRIPTION OF THE FIGURES

The present invention will be more apparent from the following description of a not limiting embodiment with reference to the attached drawings, wherein.

DETAILED DESCRIPTION OF THE INVEVTION

Figure 1:
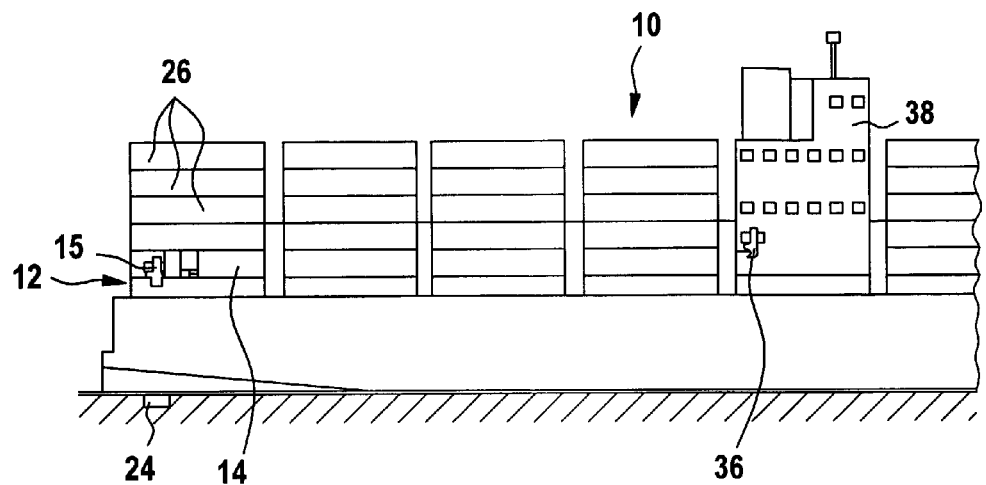
FIG. 1 is a side view a container ship comprising an MPS system according to the invention.

FIG. 1 schematically shows the front left side (port) of a container ship 10 comprising a maritime power supply (MPS) system 12 for supplying power to the container ship when docked. The maritime power supply system 12 comprises a stackable power supply container 14 placed on the container ship 10. The stackable power supply container 14, which can be seen in more detail on FIGS. 3 and 4, comprises at least one cable management system 15 having a power cable assembly 16 wound on a reel 18. The power cable assembly 16 has, at a first end, first connection means (not shown) for connecting the cable management system 18 to the container ship 10 and, at an opposite second end, second connection means 22, preferably 6600 V electrical connectors, for connecting the cable management system 18 to a dockside power supply 24. The reel 18 is arranged such that the power cable assembly 16 can be wound thereon and wound therefrom as needed.

The stackable power supply container 14 can be arranged anywhere along the side or mooring of the ship. Although, the ship can face the dock with either of its sides—port or starboard—and although the dockside power supply 24 is rarely in the same place alongside the ship, a single cable management system 15 onboard the container ship 10 is sufficient, while maintaining the distance between the maritime power supply system 12 and the dockside power supply 24 as small as possible in order to avoid cables running alongside the ship either on the dock or on the ship.

The stackable power supply container 14 has standard ISO dimensions similar to those of goods containers 26 placed on the container ship 10. This is particularly advantageous as it can use the same fixing hatches as the goods containers 26.

Furthermore, the stackable power supply container 14 can be moved with the same means as the goods containers 26, i.e. standard dockside or onboard cranes.

Figure 2:
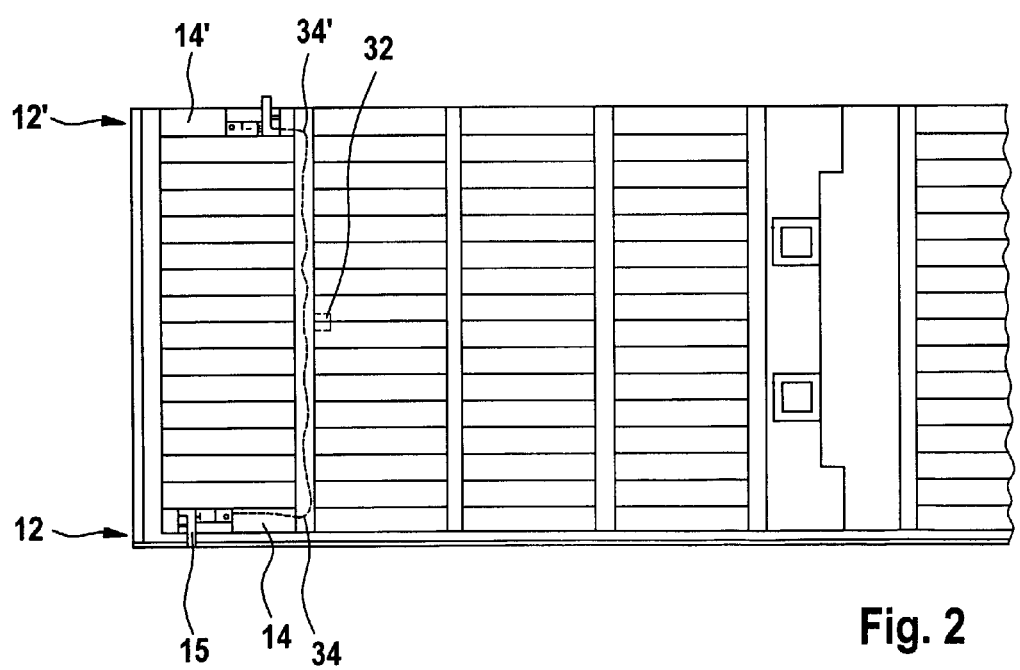
FIG. 2 is a top view onto the container ship of FIG. 1.

The second connection means 22, e.g. 6600 V electrical connectors, of the power cable assembly 16 are preferably connected, via push-pull couplings, to the dockside power supply 24. The other end of the power cable assembly, exiting the cable management system, slip ring side, is connected, via first connection means, to a step-down transformer and/or converter 28 arranged in the stackable power supply container 14 for adapting the power output from the dockside power supply 24 to the ship's power needs. The electrical connectors of the first and second connection means are preferably provided with pilot circuits for electrical safety. The output of the transformer and/or converter 28 is fitted with third connection means 30, e.g. low voltage electrical connectors, for connecting to the ship. As shown in FIG. 2, the container ship 10 can be provided with a power inlet unit 32 for receiving power from the MPS system and the cable management system 15 and delivering it to the ship 10. The connection between the stackable power supply container 14 and the power inlet unit 32 can be made via an onboard power cable assembly 34 running from the stackable power supply container 14 to the power inlet unit 32, one end of the onboard power cable assembly 34 being connected to the third connection means 30 and the other end being connected to the ship's power inlet unit 32.

FIG. 2 shows a stackable power supply container 14' arranged on the starboard side of the ship and the onboard power cable assembly 34' for connecting the stackable power supply container 14' to a power inlet unit 32. The positioning of the power inlet unit 32 can be anywhere on the ship.

It will be noted that the onboard power cable assembly 34 can be a cable assembly running on the deck or laying on cable ladders of the ship 10 between the containers 14, 26.

The ship can further be provided with a permanent cable management system 36, preferably arranged at a location where a stackable power supply container 14 cannot be placed, such as for example on a ship deck level section 38 of the ship 10.

Figure 4:
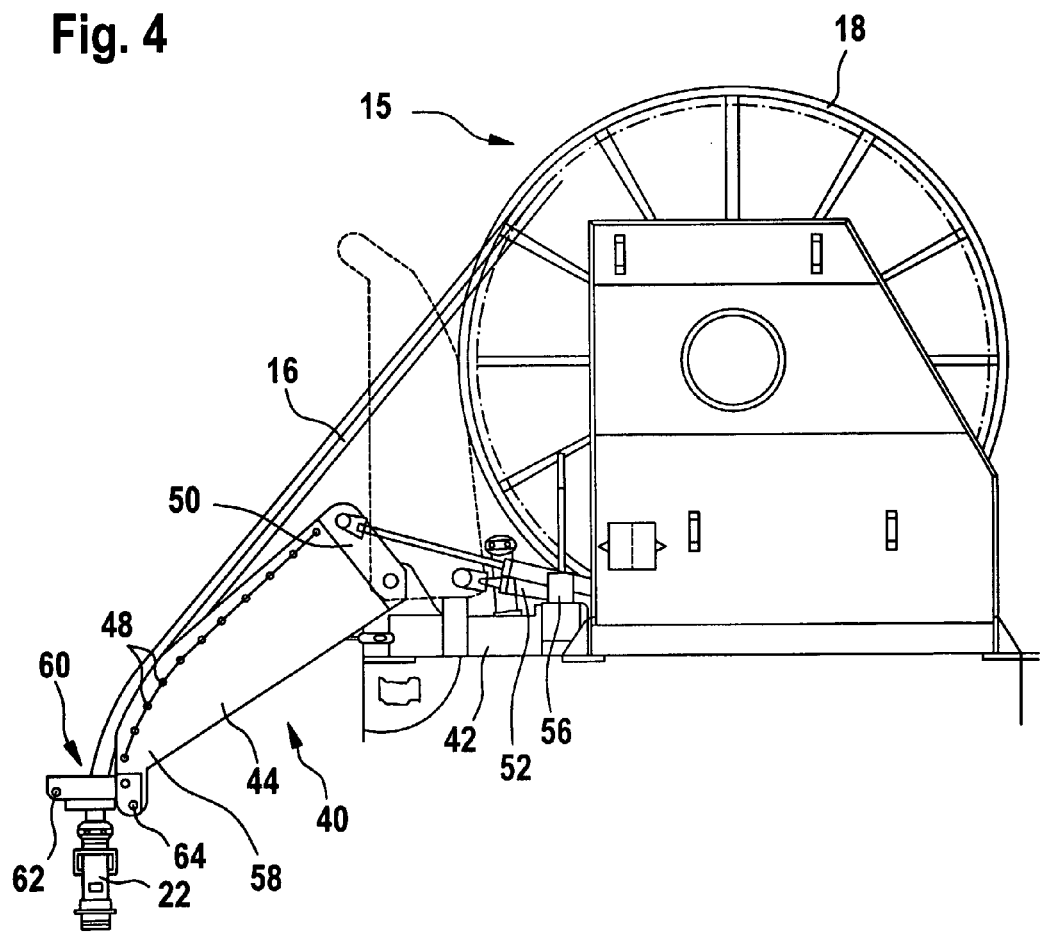
FIG. 4 is a side view of a reel of the MPS system of FIG. 1.

The cable management system 15 of the stackable power supply container 14 will now be further described by referring to FIG. 4. The cable management system 15 comprises a rotably arranged reel 18 for receiving the power cable assembly 16 thereon. Upon rotation of the reel 18, generally by operating a motor coupled to a cable drum of the reel 18, the power cable assembly 16 is wound onto the reel 18 or unwound therefrom.

Figure 3:
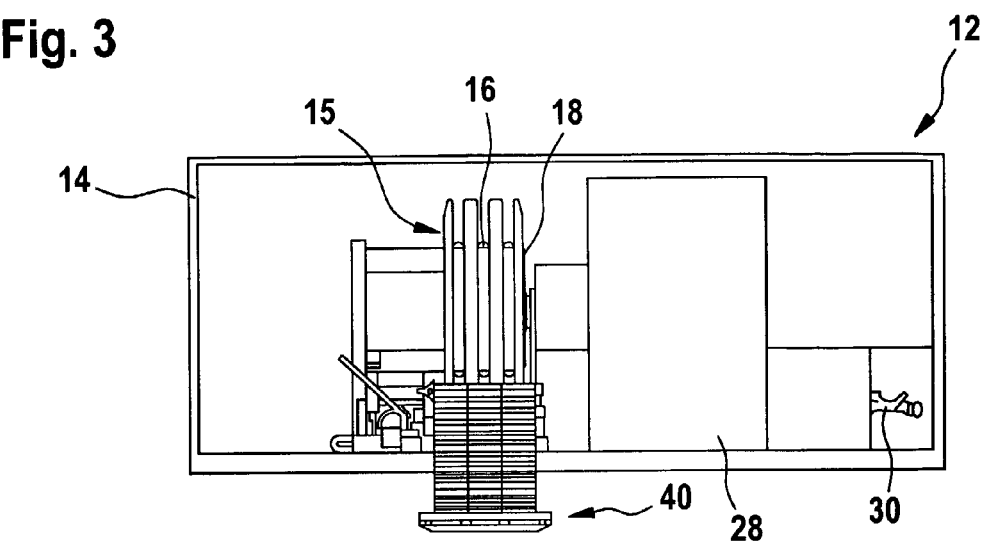
FIG. 3 is a side view of the MPS system of FIG. 1.

The reel 18 can be arranged in the power supply container 14 with its rotational axis perpendicular to a dock-facing sidewall of the container 14 or, as shown in FIG. 3, with its rotational axis parallel to the dock-facing sidewall.

The MPS system 12 further comprises a pivotable cable guide 40 arranged near the dock-facing sidewall of the power supply container 14. The cable guide 40 is pivotable between an active position as shown in FIG. 4 and a rest position as shown in dotted lines in FIG. 4. The cable guide 40 is arranged such that, when it is in its active position, it is capable of guiding the power cable assembly 16 over the edge of the container ship 10. Damage to the power cable assembly 16 by dragging the latter over the edge of the ship can thereby be prevented. When not in use, the cable guide 40 can be retracted and be brought into its rest position, whereby a more compact configuration of the MPS system 20 can be obtained.

Figure 5:
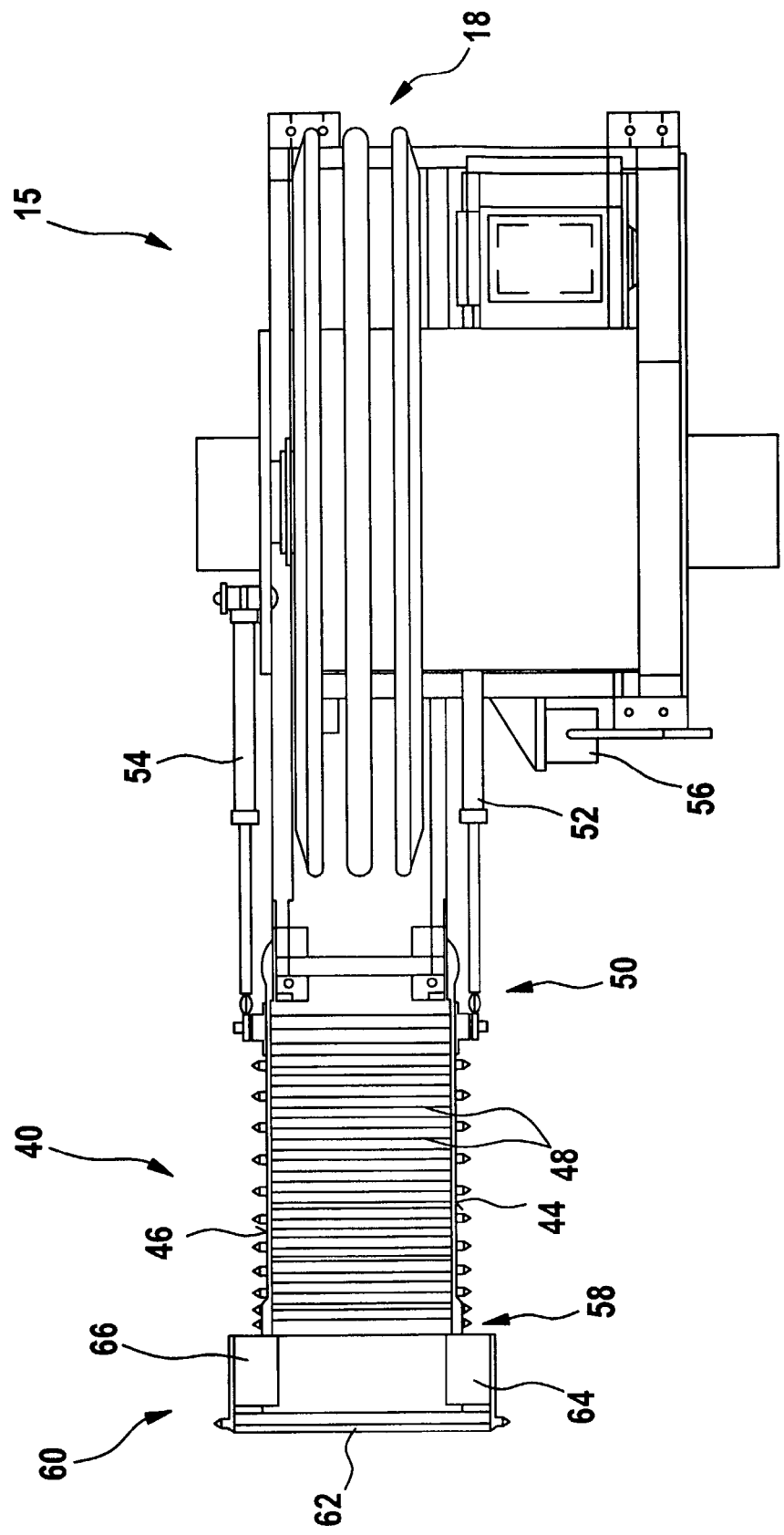
FIG. 5 is a top view onto the reel of FIG. 4.

If the rotational axis of the reel 18 is perpendicular to the dock-facing sidewall, the MPS system 12 further comprises a support and guide system (not shown) for leading the power cable assembly 16 from the reel 18 to the cable guide 40 and for bringing the power cable assembly 16 in line with the cable guide 40. If the rotational axis of the reel 18 is parallel to the dock-facing sidewall, the cable guide 40 is preferably arranged directly in line with the power cable assembly 16, such that no support and guide system is necessary. In such a case, the cable management system 15 and the cable guide 40 preferably form a reel-guide assembly, wherein the cable management system 15 is mounted on a base 42 and the cable guide 40 is pivotably connected to the base 42. A cable management system 15 of this type is generally shown in FIGS. 4 and 5.

The cable guide 40 comprises first and second support elements 44, 46. These support elements 44, 46 are arranged parallel to each other and are made from strong material such as e.g. metal. Indeed, the cable guide 40 must be capable of carrying very heavy load and resist damage in very adverse weather conditions.

A plurality of rolls 48 are arranged between the first and second support elements 44, 46 for supporting and guiding the power cable assembly 16. These rolls 48 are preferably also made from strong material such as e.g. metal.

According to an embodiment, the cable guide 40 can comprise at least a third support element (not shown) between the first and second support elements 44, 46. A first set of rolls is then arranged between the first and third support elements and a second set of rolls is arranged between the third and second support elements. By means of the third support element, the structure of the cable guide 40 is further strengthened and the cable guide 40 is divided into two zones, wherein two separate power cable assemblies can be guided over the edge of the ship independently from each other.

The cable guide 40 is pivotably connected with a first end 50 to the base 42 and at least two pistons 52, 54 are arranged between the cable guide 40 and the base 42 for pivoting the cable guide 40 between the active and rest positions. The pistons 52, 54 can be operated by a hydraulic hand pump 56. However, it is also possible to couple the cable guide 40 to a motor.

At a second end 58 of the cable guide 40, the latter comprises a guiding element 60 for guiding the power cable assembly 16 from the cable guide 40 down the side of the ship. Such a guiding element 60 preferably comprises the last one of the rolls 48 and an additional roll 62 at a distance therefrom so as to receive the power cable assembly 16 therebetween. The distance between the last one of the rolls 48 and an additional roll 62 is sufficient to also pass the connector 22 of the power cable assembly 16 therebetween. The guiding element 60 can further comprise two lateral rolls 64, 66. Such a guiding element 60 allows the power cable assembly 16 to be always guided from the dock onto the cable guide 40.

It will be appreciated that a reel-guide assembly as described above, comprising the cable management system 15 and the cable guide 40 mounted on a base 42 can also be arranged on a ship without integration thereof in a power supply container.

The cable management system 15 can further be provided with a pendant or a radio control unit (not shown) for controlling any motor or hydraulic pump 56 arranged in the stackable power supply container 14 for operating the reel 18 and/or the cable guide 40. This allows the operator of the MPS system 12 to control the cable management system from a safe distance, away from any moving parts.

The invention claimed is:

1. A method for supplying power to a docked ship, comprising:

placing a stackable power supply container in a desired location on said ship, said power supply container comprising a cable management system with at least one power cable assembly mounted on a reel, said power cable assembly comprising a first end and an opposite second end;

connecting said first end of said power cable assembly to said ship;

unwinding said power cable assembly from said reel; and connecting said second end of said power cable assembly to a dockside power supply;

before said unwinding said power cable assembly from said reel, bringing a cable guide from a rest position to an active position so as to guide said power cable assembly over an edge of said ship;

wherein said bringing said cable guide into an active position comprises operating a hydraulic pump.

2. The method according to claim 1, wherein operation a motor and/or operating said hydraulic pump are controlled by means of a pendant or radio control unit.

* * * * *